United States Patent [19]

Van Vliet et al.

[11] 4,436,994
[45] Mar. 13, 1984

[54] PHOTOMULTIPLIER DETECTOR PROTECTION DEVICE AND METHOD

[75] Inventors: James G. Van Vliet, La Habra; James R. Brown, Huntington Beach, both of Calif.

[73] Assignee: Beckman Instruments, Inc., Fullerton, Calif.

[21] Appl. No.: 334,810

[22] Filed: Dec. 28, 1981

[51] Int. Cl.³ .............................................. H01J 31/50
[52] U.S. Cl. ..................................................... 250/207
[58] Field of Search ........... 313/523, 103 R, 103 CM, 313/104, 105, 105 CM; 250/207, 213 VT

[56] References Cited

U.S. PATENT DOCUMENTS 3,694,659 9/1972 Ramsay et al. ...................... 250/207
3,714,441 1/1973 Kreda .
4,195,222 3/1980 Fouilloy ........................ 250/213 VT Primary Examiner—David C. Nelms
Assistant Examiner—J. Jon Brophy
Attorney, Agent, or Firm—R. J. Steinmeyer; R. R. Meads; G. T. Hampson

[57] ABSTRACT

A photomultiplier detector protection system and method utilizing a negative feedback loop to maintain the photomultiplier detector output below a predetermined output. The feedback loop comprises a comparator responsive to the photomultiplier detector output and also responsive to a predetermined limit signal. The comparator output is applied to a summing amplifier which also receives a voltage adjust signal. The output of the summing amplifier controls the output of a power supply which is in turn applied to the photomultiplier detector.

10 Claims, 1 Drawing Figure

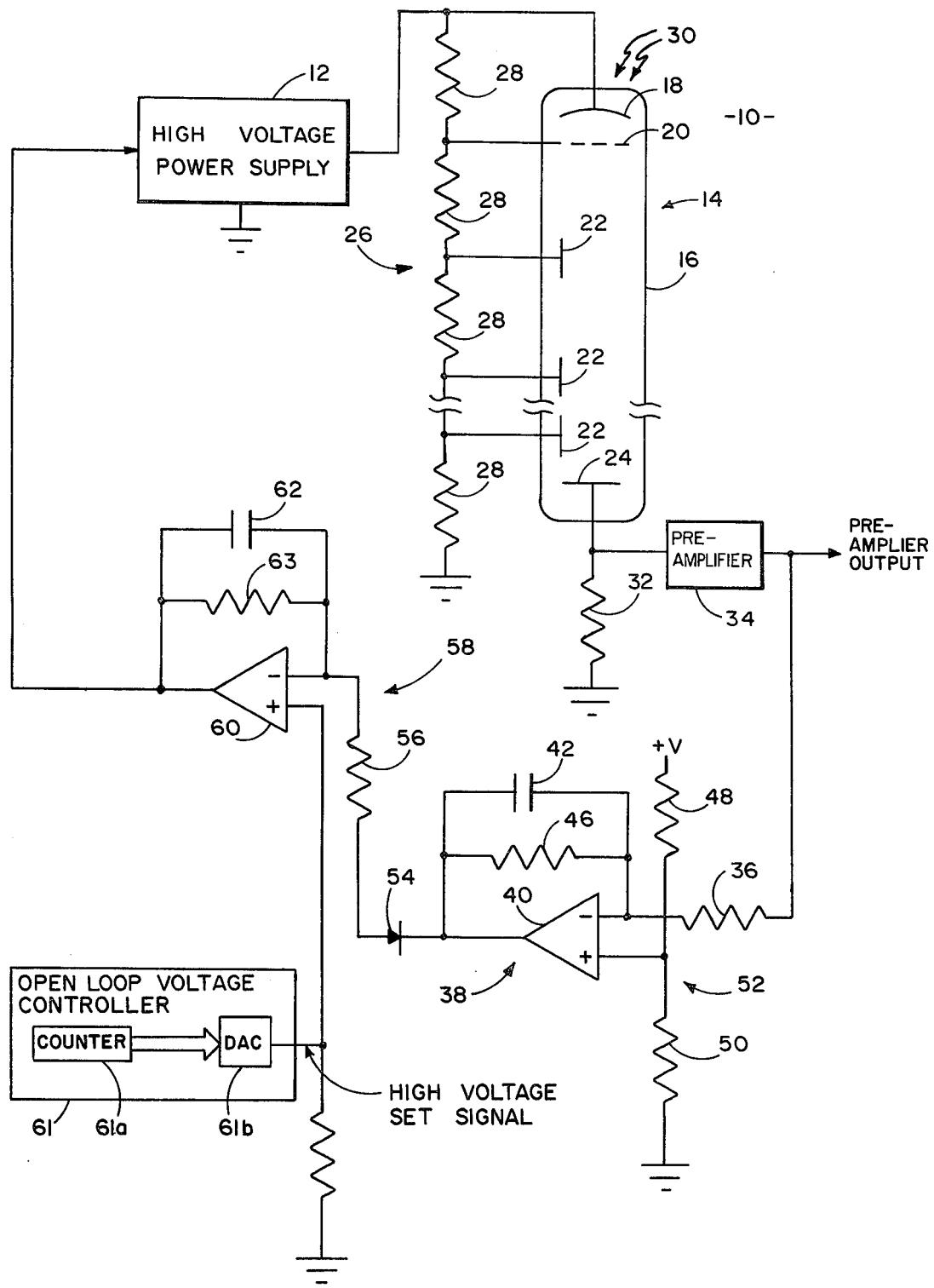

PHOTOMULTIPLIER DETECTOR PROTECTION DEVICE AND METHOD

BACKGROUND OF THE INVENTION

1. Field of the Invention

The present invention relates generally to photomultiplier detectors and, more particularly, to a protection device and method for use therewith. The invention is particularly suited for protecting a photomultiplier detector against damage which can result from the application of excessive incident light flux while maintaining the operation of the detector at a safe level until the excessive incident light flux is reduced or removed.

2. Description of the Prior Art

Photomultiplier detectors are used in numerous applications where low light levels are sensed or detected. In such detectors, light energy is directed onto a photoemissive cathode which emits electrons in proportion to the incident light energy. The emitted electrons are directed at a first of a series of dynodes that emits an increased number of electrons through a process known as secondary emission. The increased number of secondary emission electrons from each dynode is cascaded onto the next dynode within the series, producing an output current through an anode positioned to receive the electron emission from the last dynode. The amplification resulting from the secondary emission at each dynode can result in extremely sensitive photomultiplier detectors having gains or ratios of anode currents to cathode currents as high as $10^8$ or more.

Each dynode within the dynode series is connected to a source of relatively high voltage, the voltage increasing from the first to the last dynode in the series. Generally, a high voltage power supply serves as a high voltage source for a voltage divider network of fixed resistors that in turn supplies the various voltages required by the dynode series. The output current flowing from the photomultiplier detector is proportional both to the incident light energy falling upon the photo-emissive cathode and also to the voltage applied to the voltage divider network and in turn to the dynodes. The voltages applied to the dynodes from the voltage divider network are sometimes referred to hereinafter collectively as "dynode voltage". Thus for a given constant incident light flux or intensity, the output current flowing from the detector anode can be varied by varying the dynode voltage (that is, by varying the high voltage applied to the voltage divider network). Since the sensitivity of the photomultiplier detector can be expressed as the output current flow for a given constant incident light flux, it is seen that the detector sensitivity is varied by varying the dynode voltage.

A problem associated with using photomultiplier detectors is protecting a detector from combinations of incident light flux and dynode voltage which can produce a destructively high current flow within the detector. Such a situation can occur where the dynode voltage and thus the detector sensitivity is initially set for a first relatively low incident light flux. However, if the incident light flux is increased, the current multiplying effect within the photomultiplier device can raise the current flowing therethrough to a level which can damage or destroy the detector. Hence, it is necessary to protect the photomultiplier detector from combinations of incident light and dynode voltage which can result in an excessive current flow through the detector.

The problem of photomultiplier detector protection arises in the field of spectrophotometry where photomultiplier detectors are widely used in spectrophotometers to sense the light passing through a sample undergoing spectral analysis.

Several situations occur where the photomultiplier detector can be exposed to light intensities which can result in damage to the detector. Generally, spectrophotometers have a sample compartment that receives a sample for analysis. When placing the sample into the sample compartment, the ambient room light can flood the compartment and can enter the optical path leading to the photomultiplier detector. Ambient light levels in such an instance can be considerably above the light level applied to the detector during normal operation. Also, changes in light wavelength can result in substantial variations in incident light intensity because of the wavelength-dependent differences in spectral energy content of light emanating from the source within the spectrophotometer and because of non-uniformities in the dispersion of light by the optical elements within the spectrophotometer's optical path. Variations in photomultiplier detector spectral sensitivity for changing incident light wavelength can also lead to detector damage. Moreover, the photomultiplier detector can be exposed to high light intensities during servicing of the spectrophotometer instrument as, for example, when the optical path is opened to room ambient light. In each of these instances, it is possible for the photomultiplier detector to receive sufficient incident light flux which, along with the applied dynode high voltage, can result in damage to the detector.

Generally, two types of spectrophotometers are known. The first type is a double-beam spectrophotometer while the second type is a single-beam spectrophotometer.

In a dual-beam spectrophotometer, light from a light source is rapidly alternated between a sample beam path and a reference beam path. A sample material and a reference material are placed in the respective paths and the sample and reference beams are then multiplexed to form a combined single beam that is applied to a photomultiplier detector. The output current from the photomultiplier detector is demodulated to provide reference and sample signals corresponding to the light intensities in the respective reference and sample paths. The reference signal is applied to a dynode voltage control circuit which adjusts the dynode voltage to maintain the reference signal at a predetermined level related to a predetermined output current from the detector. The predetermined output current is selected to be well within the normal output current range of the detector.

If the reference signal varies from the predetermined level, as may normally result from changes in the light source intensity or drift in the photomultiplier detector sensitivity, the dynode voltage control circuit adjusts the dynode voltage in a direction and by an amount necessary to correct for the difference between the reference signal and the predetermined level. The dynode voltage control circuit continually operates in this manner to provide a relatively stable reference signal. As is well known in the art, the sample signal is compared with the reference signal to determine, for example, the transmittance of the sample material as compared to the reference material.

The reference signal adjustment process just described can also serve to protect the photomultiplier detector from over-current damage. For example, if stray ambient light should fall on the detector or if the intensity of the light source should vary considerably, the dynode voltage control circuit produces a corresponding change in the dynode voltage and a reduction in the photomultiplier detector sensitivity. The continual adjustment of dynode voltage thus maintains the detector output current within the normal output current range and substantially eliminates damage to the detector. In this way, the dynode voltage control circuit provides inherent protection of the photomultiplier detector in a double-beam spectrophotometer.

However, such inherent protection is not present in a single-beam spectrophotometer instrument. In such an instrument, the sample and reference materials are measured at different times in the same optical path. The reference material is first placed into the single-beam optical path and the dynode voltage is adjusted so that the detector output current is equal to a predetermined reference level within the normal output current range of the detector. Once the adjustment is completed, the dynode voltage is held constant. The reference material is removed from the single-beam optical path and is replaced with the sample material whereupon sample measurements are made. As is known in the art, the sample measurements are compared to the reference level to determine characteristics of the sample such as transmittance. If the intensity or flux of the light incident upon the detector during the sample measurement period increases substantially, the constant dynode voltage applied during this time can cause a damaging overcurrent condition in the detector. Thus, it is desirable to provide protection for the detector in a single-beam spectrophotometer so that wide variations in incident light flux will not lead to damage or destruction of the detector.

One way known for protecting the photomultiplier detector in such instruments is to provide a mechanical shutter arrangement which closes the light path from the sample compartment to the photomultiplier detector when the compartment is opened. Although this can be a satisfactory solution to the problem during normal operation of the spectrophotometer, the shutter arrangement increases the mechanical complexity of the spectrophotometer. Also, shutters can fail or become sluggish and cannot be provided to protect the detector against ambient light in all circumstances such as, for example, when the spectrophotometer is being serviced as described above.

Another form of photomultiplier detector protection known to applicants is included in a single-beam spectrophotometer instrument designated the model DU ®-8, manufactured and sold by the assignee of the present application. In the DU-8 instrument, a comparing circuit monitors the output of the photomultiplier detector during sample measurement period and compares the output to a predetermined limit indicating that the output current is approaching a level above which damage would result. If the output reaches the limit because of excessive incident light flux for the constant dynode voltage, the detector dynode voltage is removed. With such an arrangement, however, it was not possible to determine when the excessive incident light flux is removed from the detector because detector operation ceases with the removal of the dynode voltage. Consequently, once the cause of the excessive light flux condition is corrected, it is necessary to restart the spectrophotometer operational cycle, a relatively time consuming and inconvenient process particularly where a number of sample measurements are to be taken.

Thus, there is a need for a photomultiplier detector protection circuit which not only senses the presence of an excessive light flux condition in order to protect the photomultiplier detector, but which also is able to sense when the excessive incident light condition is terminated so that operation of the spectrophotometer can continue without further interruption.

SUMMARY OF THE INVENTION

The present invention overcomes the limitations described above and meets the foregoing needs. The present invention resides in a system and method which provides substantially continuous control over the photomultiplier detector sensitivity. The photomultiplier detector output is continuously monitored so that both the beginning and the end of an excessive incident light flux condition can be sensed. The photomultiplier detector sensitivity is controlled to prevent detector damage during periods of excessive incident light flux. When the photomultiplier detector is used in an instrument such as a single-beam spectrophotometer as described above, operation of the instrument can resume once the excessive incident light flux condition ends without further interruption. Advantageously, the instrument need not be reset or restarted once an excessive light flux condition is sensed.

To the foregoing ends, the present invention is embodied in a detector protection system including a power supply for generating an adjustable output voltage in response to a control signal. A photomultiplier detector is responsive to incident light flux and to the power supply output voltage for generating an output related to the incident light flux and the magnitude of the power supply output voltage.

A comparator is responsive to a reference signal and is also responsive to the photomultiplier detector output. The comparator compares the reference signal with the detector output and in turn generates an output when the reference signal and the photomultiplier detector output are in a first predetermined relationship. In a preferred embodiment as disclosed herein, the reference signal establishes a safe maximum output level for the photomultiplier detector and the comparator generates its output when the photomultiplier detector output is greater than the safe maximum output level.

The system further includes a summing stage responsive to the comparator output and also responsive to an adjustment signal proportional to a predetermined power supply output voltage. When the photomultiplier detector output is below the limit set by the reference signal, the voltage of the power supply is set in accordance with the adjustment signal applied to the summing amplifier. However, when the photomultiplier detector reaches the safe maximum output level, the comparator and the summing amplifier provide a negative feedback loop which serves to control the voltage applied to the photomultiplier detector such that the detector output does not substantially exceed the level set by the reference signal. In the preferred embodiment disclosed herein, this feedback loop provides linear negative feedback for the control of the high voltage.

Stated somewhat differently, the voltage applied to the photomultiplier detector is controlled by the adjustment signal as long as the photomultiplier detector output remains below a predetermined fixed limit below which the detector can be safely operated. However, once the photomultiplier detector output reaches this limit, a negative feedback loop then controls the voltage such that the photomultiplier detector output does not rise substantially above the predetermined limit. Thus, it is seen that the photomultiplier detector is operated in an open loop fashion (i.e., controlled only by the adjustment signal) as long as the photomultiplier detector output is within a safe operating range. Such operation is a necessary element of a single-beam spectrophotometer in that the photomultiplier detector must be operated in an open-loop fashion during the measurement of the sample. However, once an excessive output is detected because the incident light flux is excessive for the voltage applied to the detector in response to the adjustment signal, the photomultiplier detector voltage is then controlled via a negative feedback loop to protect the photomultiplier detector, that is, the detector is then operated in a closed-loop manner. The closed-loop protection system continues to control the voltage during the time that an excessive incident light flux condition exists.

Once the excessive incident light flux condition ends, the closed-loop protection system ceases to control the voltage applied to the photomultiplier detector, and the voltage is again controlled by the adjustment signal in an open-loop fashion so that, for example, spectrophotometer operation can continue without further interruption.

BRIEF DESCRIPTION OF THE DRAWING

The sole FIGURE is a simplified schematic diagram of a photomultiplier detector protection system in accordance with the present invention.

DESCRIPTION OF THE PREFERRED EMBODIMENT

With reference now to the drawing, a photomultiplier detector protection system 10 embodying the present invention includes a high voltage power supply 12. The power supply 12 is of conventional design and can be, for example, a switching-type power supply. The power supply 12 generates a negative output voltage that is controlled in accordance with an input signal derived as described hereinbelow. The output voltage is applied to a photomultiplier detector shown generally as 14.

The photomultiplier detector 14 includes a photomultiplier tube 16 of conventional design including a photoemissive cathode 18, an optional control electrode 20, an electron multiplier section comprising a plurality of dynodes 22, and an anode 24. In a preferred embodiment, the photomultiplier tube 16 is a commercially available type R928 photomultiplier tube manufactured and sold by Hamamatsu TV Co. Ltd., as described in a Hamamatsu catalog number SC-1-3 revised February, 1979.

The output from the high voltage power supply 12 is connected to the cathode 18 and is also applied to a voltage divider network 26 connected to ground comprising a plurality of individual fixed resistors 28. The voltage divider network 26 divides the voltage from the power supply 12 to provide increasing positive potentials to respective ones of the dynodes 22 from the cathode 18 to the anode 24. Light flux incident upon the cathode 18 as shown by the arrows 30 produces electron flow from the cathode 18 by photo-emission. The electron flow is multiplied by the dynodes 22 and is ultimately collected by the anode 24. The output current from the anode 24 is applied across resistor 32 which is in turn connected to ground and to a preamplifier 34, the output of which provides a preamplifier output signal. The preamplifier output is processed in a fashion well known in the art as, for example, in a single-beam spectrophotometer. Thus it is seen that the power supply 12, the detector 14 and the preamplifier 34 are conventional elements of a photomultiplier detector system.

The output from the preamplifier 34 is also connected through a resistor 36 to a negative feedback comparator shown generally at 38. The comparator includes a conventional operational amplifier 40, the inverting input of which is connected to the resistor 36. The inverting input is also connected via a conventional feedback compensation network comprising a capacitor 42 and a resistor 46 to the output of the amplifier 40.

Two resistors 48 and 50 form a voltage dividing network generally designated 52. One terminal of the resistor 48 is connected to a suitable voltage source (+V) while one terminal of the resistor 50 is connected to ground. The common node between the resistors 48 and 50 is connected to the non-inverting input of the amplifier 40. The network 52 establishes a predetermined over energy limit corresponding to a predetermined safe maximum output current flow from the photomultiplier detector 14 and a resulting preamplifier 34 output. The predetermined safe current flow is preferably somewhat less than the maximum current permissible through the photomultiplier detector 14 and establishes a safe operating range for the photomultiplier detector.

The output of the amplifier 40 is applied to the cathode of a diode 54, the anode of which is connected through a resistor 56 to a summing stage generally designated 58. The summing stage 58 comprises a conventional operational amplifier 60 having an inverting input connected to the resistor 56. The inverting input is also connected through a conventional feedback compensation network comprising a capacitor 62 and a resistor 63 connected to the output of the amplifier 60. A high voltage set signal is applied to the non-inverting input of the amplifier 60. The high voltage set signal is generated by an open loop voltage controller 61 to control the output voltage of the power supply 12 and thus the sensitivity or gain of the photomultiplier detector 14. The open loop voltage controller 61 can be any conventional signal source which is adjusted to control the sensitivity of the detector 14. In a single-beam spectrophotometer, for example, the open loop voltage controller 61 can comprise an adjustable digital counter 61a generating a plurality of digital output signals that are applied to a digital-to-analog converter (DAC) 61b. The DAC 61b generates the high voltage set signal according to the applied digital signals. The digital counter 61a output is adjusted to vary the high voltage set signal during the dynode voltage adjustment done for the reference material a described hereinbefore and as is well known in the art.

Turning now to the operation of the photomultiplier detector protection system 10, the high voltage set signal is amplified by the summing stage 58 to generate a resulting high voltage adjustment signal that is applied to the high voltage power supply 12. The power supply 12, in response to the magnitude of the adjustment signal, provides a proportional output voltage to the photomultiplier detector 14. As incident light flux 30 is applied to the detector 14, current flows through the detector 14 in proportion to the intensity of the light flux 30 and the voltage applied from the power supply 12. The output is amplified by means of the preamplifier 34 and is applied to the comparator 38.

The comparator 38 establishes the maximum output that is allowable from the preamplifier 34 and consequently the maximum safe output current from the photomultiplier detector 14. In particular, when the combination of incident light flux 30 and power supply 12 voltage generates a detector 14 output within the safe operating range, the preamplifier output is below the over energy limit set by the voltage dividing network 52. Under such circumstances, the output of the amplifier 40 is positive with respect to the output of the summing stage 58 and the diode 54 does not conduct, thereby isolating the summing stage 58 from the comparator 38.

If, however, the incident light flux 30 increases such that the combination of incident light flux 30 and power supply 12 voltage generates a detector 14 output that is above the over energy limit established by the voltage dividing network 52, the output of the comparator 38 from the amplifier 40 becomes negative with respect to the output of the amplifier 60. Consequently, the diode 54 conducts and applies the output from the amplifier 40 through the diode 54 and the resistor 56 to the inverting input of the amplifier 60. This in turn causes a shift in the output of the amplifier 60 in a direction which causes a corresponding reduction (decrease in the magnitude of the negative voltage toward zero) in the high voltage output from the power supply 12. The reduced power supply voltage decreases the dynode voltage and the sensitivity or gain of the photomultiplier detector 14 and reduces the output of the preamplifier 34. As the magnitude of the correction to power supply voltage increases, as with further increases in incident light flux 30, the magnitude of the negative output from amplifier 40 correspondingly increases, thereby further reducing the power supply voltage to maintain the detector 14 output substantially equal to the over energy limit set by the voltage divider network 52.

Assuming now that the incident light flux 30 decreases, the magnitude of the negative output of the amplifier 40 also decreases to consequently increase the power supply voltage and thereby maintain the detector 14 output substantially equal to the over energy limit set by the voltage divider network 52. If the incident light flux 30 continues to decrease such that the combination of incident light flux 30 and power supply voltage established by the high voltage set signal results in a detector output within the safe operating range, the detector 14 output becomes less than the over energy limit. Under such circumstances, the comparator 38 is isolated from the summing stage 58 and the high voltage set signal again controls the power supply 12 output voltage.

In this way, the comparator 38 and summing amplifier 58 comprise a negative feedback loop which controls the output of the high voltage power supply 12 to maintain the detector 14 output substantially at or below the limit established by the voltage dividing network 52. Once the limit is reached, the comparator 38 provides linear negative feedback to the summing amplifier 58 to correspondingly control the high voltage power supply 12. Thus the photomultiplier detector protection system 10 in accordance with the present invention provides continuous control of the detector 14 output. The power supply 12 is controlled in an open loop fashion by the high voltage set signal as long as the output from the detector 14 and hence the preamplifier 34 is less than the over energy limit established by the voltage dividing network 52. However, if the detector output exceeds this limit, the high voltage power supply 12 is then controlled in a closed-loop negative-feedback fashion to limit the detector output. Consequently, the detector 14 is under constant control, either open-loop or closed-loop.

It will be recognized that the comparator 38 and the summing stage operate with equal effectiveness if the light flux 30 remains constant and the open loop voltage controller 61 generates a high voltage set signal which would result in a detector 14 output current greater than the over energy limit. The negative feedback loop again controls the high voltage power supply 12 as described above to maintain the detector 14 output current within a safe operating range.

Thus, the photomultiplier detector protection system of the present invention uniquely provides continuous control over the sensitivity of the photomultiplier detector to thereby prevent detector damage. This feature allows the output of the detector to be used after and occurrence of excessive incident light flux without having to reset or readjust the control of the high voltage power supply. This is particularly advantageous in a single-beam spectrophotometer where continued spectrophotometer operation is desired after such an occurrence without resetting the control of the high voltage power supply.

While a preferred embodiment of the present invention has been illustrated and described, it will be understood that various modifications may be made therein without departing from the subject and scope of the appended claims.

What is claimed is:

1. An improved photomultiplier detector protection system wherein an adjustment signal from external means adjusts the sensitivity of the photomultiplier detector, the system comprising:
    a power supply for generating a variable output voltage in response to a control signal;
    a photomultiplier detector responsive to incident light flux and to the power supply output voltage for generating an output related to the incident light flux and the magnitude of the power supply output voltage;
    reference means for generating a reference signal proportional to a predetermined photomultiplier detector output;
    comparator means responsive to the reference signal and responsive to the photomultiplier detector output for comparing the reference signal and the photomultiplier detector output to generate an output when the reference signal and the photomultiplier detector output are in a predetermined relationship;
    means for receiving the adjustment signal; and
    summing means responsive to the adjustment signal from the receiving means and to the comparator means output for generating the control signal by summing the adjustment signal and the comparator means output.

2. A system as in claim 1 wherein the comparator means includes means for generating the comparator means output when the photomultiplier detector output is greater than the reference signal.

3. A system as in claim 2 wherein the comparator means includes means for selecting the polarity of the comparator means output to decrease the photomultiplier detector output.

4. A system as in claim 3 wherein the comparator includes means for generating the comparator output linearly related to the magnitude of the difference between the reference signal and the photomultiplier detector output.

5. An improved photomultiplier detector protection system wherein an adjustment signal from external means adjusts the sensitivity of the photomultiplier detector, the system comprising:
 a power supply for generating a variable output voltage in response to a control signal;
 a photomultiplier detector responsive to incident light flux and to the power supply output voltage for generating an output related to the incident light flux and the magnitude of the power supply output voltage;
 reference means for generating a reference signal proportional to a predetermined photomultiplier detector output;
 comparator means responsive to the reference signal and responsive to the photomultiplier detector output for comparing the reference signal and the photomultiplier detector output to generate an output related to the magnitude of the difference between the reference signal and the photomultiplier detector output when the photomultiplier detector output is greater than the reference signal;
 means for receiving the adjustment signal;
 summing means responsive to the adjustment signal from the receiving means and to the comparator means output for generating the control signal by summing the adjustment and the comparator means output; and
 the comparator means includes means for selecting the polarity of the comparator means output to decrease the photomultiplier detector output.

6. A method of protecting a photomultiplier detector wherein an adjustment signal from external means adjusts the sensitivity of the photomultiplier detector, the method comprising:
 generating a variable voltage in response to a control signal;
 generating a photomultiplier detector output related to the light flux incident upon the photomultiplier detector and the magnitude of the variable voltage;
 generating a reference signal proportional to a predetermined photomultiplier detector output;
 comparing the reference signal and the photomultiplier detector output;
 generating a negative feedback signal when the reference signal and the photomultiplier detector output are in a predetermined relationship;
 receiving the adjustment signal; and
 generating the control signal by summing the adjustment signal and the negative feedback signal.

7. A method as in claim 6 wherein the step of generating a negative feedback signal includes generating the negative feedback signal when the photomultiplier detector output is greater than the predetermined photomultiplier detector output represented by the reference signal.

8. A method as in claim 7 including the step of selecting the polarity of the negative feedback signal to decrease the photomultiplier detector output.

9. A method as in claim 8 wherein the step of generating a negative feedback signal includes generating a negative feedback signal linearly related to the magnitude of the difference between the reference signal and the photomultiplier detector output.

10. A method of protecting a photomultiplier detector wherein an adjustment signal from external means adjusts the sensitivity of the photomultiplier detector, the method comprising:
 generating a variable voltage in response to a control signal;
 generating a photomultiplier detector output related to the light flux incident upon the photomultiplier detector and the magnitude of the variable voltage;
 generating a reference signal proportional to a predetermined photomultiplier detector output;
 comparing the reference signal and the photomultiplier detector output;
 generating a negative feedback signal with a polarity selected to decrease the photomultiplier detector output when the photomultiplier detector output is greater than the predetermined photomultiplier detector output represented by the reference signal;
 receiving the adjustment signal; and
 generating the control signal by summing the adjustment signal and the negative feedback signal.

* * * * *